(12) United States Patent
Tucker

(10) Patent No.: US 9,558,372 B2
(45) Date of Patent: Jan. 31, 2017

(54) DISABLEMENT OF LOST OR STOLEN DEVICE

(71) Applicant: Microsoft Technology Licensing, LLC, Redmond, WA (US)

(72) Inventor: Nicholas Bradley Tucker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 14/657,808

(22) Filed: Mar. 13, 2015

(65) Prior Publication Data

US 2016/0267298 A1  Sep. 15, 2016

(51) Int. Cl.
G06F 1/26 (2006.01)
G06F 21/71 (2013.01)

(52) U.S. Cl.
CPC .................................. *G06F 21/71* (2013.01)

(58) Field of Classification Search
None
See application file for complete search history.

(56) References Cited

U.S. PATENT DOCUMENTS

| | | | |
|---|---|---|---|
| 5,715,174 A | 2/1998 | Cotichini et al. | |
| 6,151,678 A | 11/2000 | Davis | |
| 6,542,731 B1 | 4/2003 | Alos | |
| 6,804,699 B1 * | 10/2004 | Henrie | G06F 21/31 709/203 |
| 7,260,835 B2 | 8/2007 | Bajikar | |
| 7,355,506 B2 | 4/2008 | Chandley | |
| 7,446,655 B2 | 11/2008 | Jha et al. | |
| 7,786,861 B2 | 8/2010 | Howarth et al. | |
| 8,095,150 B2 | 1/2012 | Dunko et al. | |
| 8,260,324 B2 | 9/2012 | Jantunen et al. | |
| 8,321,916 B2 | 11/2012 | Aissi et al. | |
| 8,351,980 B2 | 1/2013 | Wakefield | |
| 8,483,659 B2 * | 7/2013 | Mahajan | G06F 21/6245 340/5.52 |
| 8,555,411 B2 | 10/2013 | Hurwitz | |
| 8,577,294 B2 * | 11/2013 | Causey | G08B 13/1427 340/5.31 |
| 8,717,172 B2 * | 5/2014 | Parker | G08B 21/22 340/438 |

(Continued)

OTHER PUBLICATIONS

"Cerberus Anti Theft", Published on: Jun. 11, 2012. Available at <<https://play.google.com/store/apps/details?id=com.sdroid.cerberus&hl=en>>.

(Continued)

*Primary Examiner* — Farid Homayounmehr
*Assistant Examiner* — Olanrewaju Bucknor
(74) *Attorney, Agent, or Firm* — Daniel Choi; Micky Minhas

(57) ABSTRACT

Active disablement of a target device that is reported as lost or stolen, even if the device no longer has a cellular link. A service assembles a list of target devices that have been reported as lost or stolen, and transmits at least a subset of the assembled list of target devices to candidate proximate systems. If one of the candidate proximate system receives an identification signal from a target device that is on the received list, the proximate system commands the target device to at least partially disable itself. The target device then disables as commanded, and the proximate system may acknowledge the same to the service.

20 Claims, 3 Drawing Sheets

(56) References Cited

U.S. PATENT DOCUMENTS

| | | | |
|---|---|---|---|
| 8,719,909 B2 | 5/2014 | Fitzgerald et al. | |
| 2004/0006655 A1 | 1/2004 | Toffolet | |
| 2004/0192348 A1 | 9/2004 | Gudmundsson et al. | |
| 2004/0203895 A1 | 10/2004 | Balasuriya | |
| 2005/0073389 A1* | 4/2005 | Chandley | G06F 21/554 340/5.31 |
| 2005/0253714 A1 | 11/2005 | Stephens | |
| 2005/0280557 A1* | 12/2005 | Jha | H04W 8/22 340/988 |
| 2007/0192652 A1 | 8/2007 | Kao et al. | |
| 2008/0070590 A1* | 3/2008 | Miyajima | H04W 8/245 455/456.3 |
| 2008/0186162 A1* | 8/2008 | Rajan | G06F 21/88 340/539.13 |
| 2008/0233919 A1* | 9/2008 | Kenney | H04M 1/67 455/411 |
| 2010/0299731 A1 | 11/2010 | Atkinson | |
| 2013/0125218 A1* | 5/2013 | Aissi | G06F 21/6209 726/5 |
| 2013/0326642 A1 | 12/2013 | Hajj et al. | |
| 2014/0038564 A1* | 2/2014 | Mahaffey | H04L 41/0253 455/411 |
| 2014/0108789 A1 | 4/2014 | Phatak | |
| 2014/0146766 A1* | 5/2014 | Porjo | H04W 76/007 370/329 |
| 2014/0200929 A1* | 7/2014 | Fitzgerald | G06F 21/88 705/4 |
| 2016/0037318 A1 | 2/2016 | Holtmanns et al. | |
| 2016/0049975 A1 | 2/2016 | Uy et al. | |
| 2016/0099972 A1 | 4/2016 | Qureshi et al. | |

OTHER PUBLICATIONS

Henry, Alan, "Smart WiFi Toggler for Android Learns Where Your Networks Are, Toggles Wi-Fi and Data Automatically", Published Nov. 2012. Available at <<http://lifehacker.com/5963802/smart-wifi-toggler-for-android-learns-where-your-networks-are-toggles-wi-fi-and-data-automatically>>.

"Wheres My Droid", Published on: Jun. 4, 2014. Available at <<https://play.google.com/store/apps/details?id=com.alienmanfc6.wheresmyandroid>>.

"SMS GPS Enabler", Published on: Apr. 5, 2013. Available at https://play.google.com/store/apps/details?id=com.nelson.gpsenable&hl=en>>.

"Prey Anti Theft", Published on: Aug. 7, 2013. Available at <<https://play.google.com/store/apps/details?id=com.prey>>.

Knoll, "How to Track Your Lost iPhone or iPad Without a Tracking App," Published on Jun. 6, 2014. Available at http://trendblog.net/how-to-track-your-lost-iphone-or-ipad-without-tracking-app/.

Office Action dated Jun. 1, 2016 cited in U.S. Appl. No. 14/720,765.

Notice of Allowance dated Dec. 2, 2016 cited in U.S. Appl. No. 14/720,765.

* cited by examiner

DISABLEMENT OF LOST OR STOLEN DEVICE

BACKGROUND

Computing systems and associated networks have revolutionized the way human beings work, play, and communicate. Computing systems come in a wide variety of forms, many of which now being highly mobile. For instance, computing systems may now come in the form of smartphones, tablets, smart watches, fitness trackers, and wearables. Such mobile computing systems are often referred to as "mobile devices" or simply "devices". Such mobile devices are highly capable and often of high value. Accordingly, they are often high-value and easy targets for theft.

There are many solutions that aim to deter theft of such mobile devices. These solutions aim to reduce the value of the mobile device by restricting the usability of the mobile device. For instance, many mobile devices have on-device access measures that perhaps require entry of a secret before allowing the mobile device to be used. Such a user-entered secret might be a Personal Identification Number (PIN) or a password. There are also hardware measures to render mobile systems inoperable. In some cases, a service provider for the mobile device may impose network access restrictions to limit functionality.

One solution is software that allows remote restriction of a stolen or lost device. This solution enables mobile device owners to make their devices useless until recovered (if ever). This deters theft of devices since potential thieves may be aware that their illicit efforts to steal may be for naught, which discourages the effort in the first place.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to mechanisms to actively disable a target device that is suspected as lost or stolen. For instance, the target device may be a mobile device that has been left in an unknown location, or that has been stolen. The target device may be reported lost or stolen or otherwise there might exist conditions from which it could be inferred that the device is lost or stolen (e.g., such as multiple failed login attempts and/or the device has failed to check in with a service or device). By disabling functionality of the target device, the target device becomes of less value to anyone but the owner, thereby removing the impetus for another to steal the target device. The principles described herein operate even if the direct cellular connectivity of the target device is disabled (such as might happen if, for example, the cellular connection of the target device is shut off at the target device, if network credentials (e.g. SIM) are removed, or if the signal is blocked).

In one embodiment, a service (e.g., a cloud computing system, a network of servers, or even a single server) assists in delivering an active disable command to a target device despite the connection (e.g., a cellular connection) between the service and the target device being severed. The service assembles a list of target devices that are suspected as lost or stolen, and transmits at least a subset of the assembled list of target devices to candidate proximate systems (e.g., mobile devices, WiFi hotspots, etc). The service might also transmit at least an implicit (and perhaps explicit) instruction for the candidate proximate system to instruct any found target system to perform an active disable command. The service might also receive acknowledgement of processing of the instruction from any candidate proximate system.

Some embodiments described herein may relate to an example candidate proximate system that assists in delivering an active disable command to a target device. The candidate proximate system receives a list of target devices that have been suspected as lost or stolen. Though the target device does not have a cellular network connection, the candidate proximate system nevertheless receives an identification signal from eligible nearby devices. The identification signal is received over some non-cellular communication link. In response, the proximate system initiates delivery of an active disable command to the target device. The active disable command is structured to be interpretable by the target device as an instruction to actively disable at least some functionality in a manner that persists across target device resets. In some cases, the candidate proximate computing system also receives acknowledgment from the target device that the active disablement has occurred or has been attempted but failed. Furthermore, the candidate proximate computing system might report to a service when the target device is found and/or the result of the attempt of the active disablement.

Some embodiments described herein may relate to the performance of a target device that is suspected lost or stolen. Though the target device may no longer have a cellular link, the target device broadcasts an identification signal over a non-cellular communication link. The target device may repeatedly identify itself to other potential surrounding devices. The target device then ultimately receives an active disable command from one or more communicative systems (e.g., the candidate proximate system) that is responding to the broadcast of the identification signal. The target device then actively disables at least one function of the target device in a manner that persists across target device resets. The target device may then report the performance of the active disablement (and/or an estimated location of the target device) to the one or more communicative systems.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
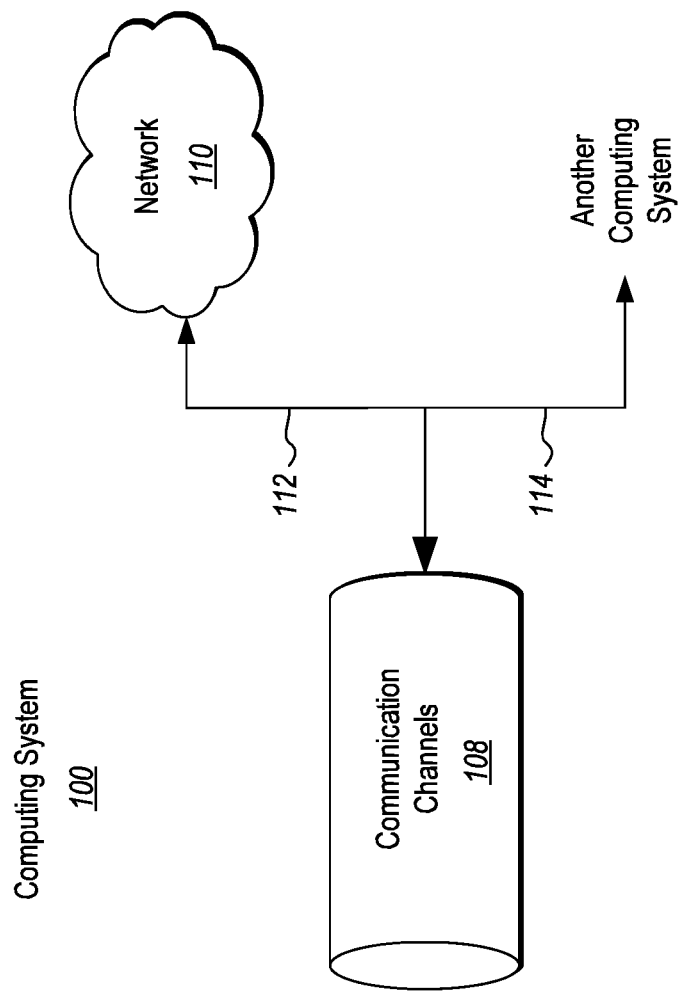
FIG. 1 abstractly illustrates a computing system in which some embodiments described herein may be employed.

At least some embodiments described herein relate to mechanisms to actively disable a target device that is suspected as lost or stolen. For instance, the target device may be a mobile device that has been left in an unknown location, or that has been stolen. The target device may be reported lost or stolen or otherwise there might exist conditions from which it could be inferred that the device is lost or stolen (e.g., such a multiple failed login attempts and/or the device has failed to check in with a service or device). By disabling functionality of the target device, the target device becomes of less value to anyone but the owner, thereby removing the impetus for another to steal the target device. The principles described herein operate even if the direct connection between the target device and the service is disabled (such as might happen if, for example, the cellular connection of the target device is shut off at the target device, if network credentials (e.g. SIM) are removed, or if the signal is blocked).

In some embodiments described herein, there are three components that interoperate to perform this disablement: a service, candidate proximate systems, and the target device itself. The service assembles a list of target devices that are suspected as lost or stolen, and transmits at least a subset of the assembled list of target devices to candidate proximate systems (e.g., mobile devices, WiFi hotspots, etc). If one of the candidate proximate systems receives an identification signal from a target device that is on the received list, the proximate system commands the target device to at least partially disable itself. The target device then disables as commanded, and the proximate system may acknowledge the same to the service.

In one embodiment, a service (e.g., a cloud computing system, a network of servers, or even a single server) assists in delivering an active disable command to a target device despite the connection between the service and the target device being severed. The service assembles a list of target devices that are suspected as lost or stolen, and transmits at least a subset of the assembled list of target devices to candidate proximate systems (e.g., devices). At one extreme, the service might simply indiscriminately broadcast the disablement command to all or some of the assembled list of target devices to all systems that the service can reach, in which any system that the system can reach may be considered a "candidate proximate system". In other embodiments, the service might strategically select which candidate proximate systems to broadcast to. The transmitted list of target devices might include the entire assembled list of target devices, but might also be a strategically selected portion of the assembled list of target devices. For instance, different portions of the assembled list of target devices might be transmitted to different candidate proximate systems. The service might also transmit at least an implicit instruction for the candidate proximate system to instruct any found target system to perform an active disable command.

The service might also receive acknowledgement of processing of the instruction from any candidate proximate system. For instance, the acknowledgement might represent that the candidate proximate system did not find the target device. The acknowledgement might represent that the target device was found and potentially also include the estimated target device location. The acknowledgment might also indicate whether or not disablement of the target device was attempted, and if so, whether the attempt was successful.

Some embodiments described herein may relate to an example candidate proximate system that assists in delivering an active disable command to a target device. The candidate proximate system receives a list of target devices that are suspected lost or stolen. Though the target device does not have a cellular network connection, the candidate proximate system nevertheless receives an identification signal from eligible nearby devices. The identification signal is received over some non-cellular communication link. In response, the proximate system initiates delivery of an active disable command to the target device. The active disable command is structured to be interpretable by the target device as an instruction to actively disable the at least some functionality in a manner that persists across target device resets.

For instance, a device reset might include 1) turning the device off and then back on, 2) restoring the device to factory settings (i.e., requiring the device to go through the setup again), or 3) reformatting the device with a different version or different type of operating system. For the last possibility, technical measures may be put in place to prevent people from being able to put on an older version of the software that might not respect the disablement, or a different type of operating system that might not understand the disablement.

Some embodiments described herein may relate to the performance of a target device that is suspected lost or stolen. Though the target device no longer has a direct cellular link with the disablement service, the target device broadcasts an identification signal over a non-cellular communication link. The target device may repeatedly identify itself to other potential surrounding devices. The target device then ultimately receives an active disable command from a communicative system (e.g., the candidate proximate system) that is responding to the broadcast of the identification signal. The target device then actively disables at least one function of the target device in a manner that persists across target device resets. The target device may then report the performance of the active disablement (and/or an estimated location of the target device) to the communicative system.

Some introductory discussion of a computing system will be described with respect to FIG. 1. Then, the structure and operation of embodiments described herein will be presented with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110 (as represented by arrow 112), or directly via an ad hoc connection to another computing system (as represented by arrow 114).

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
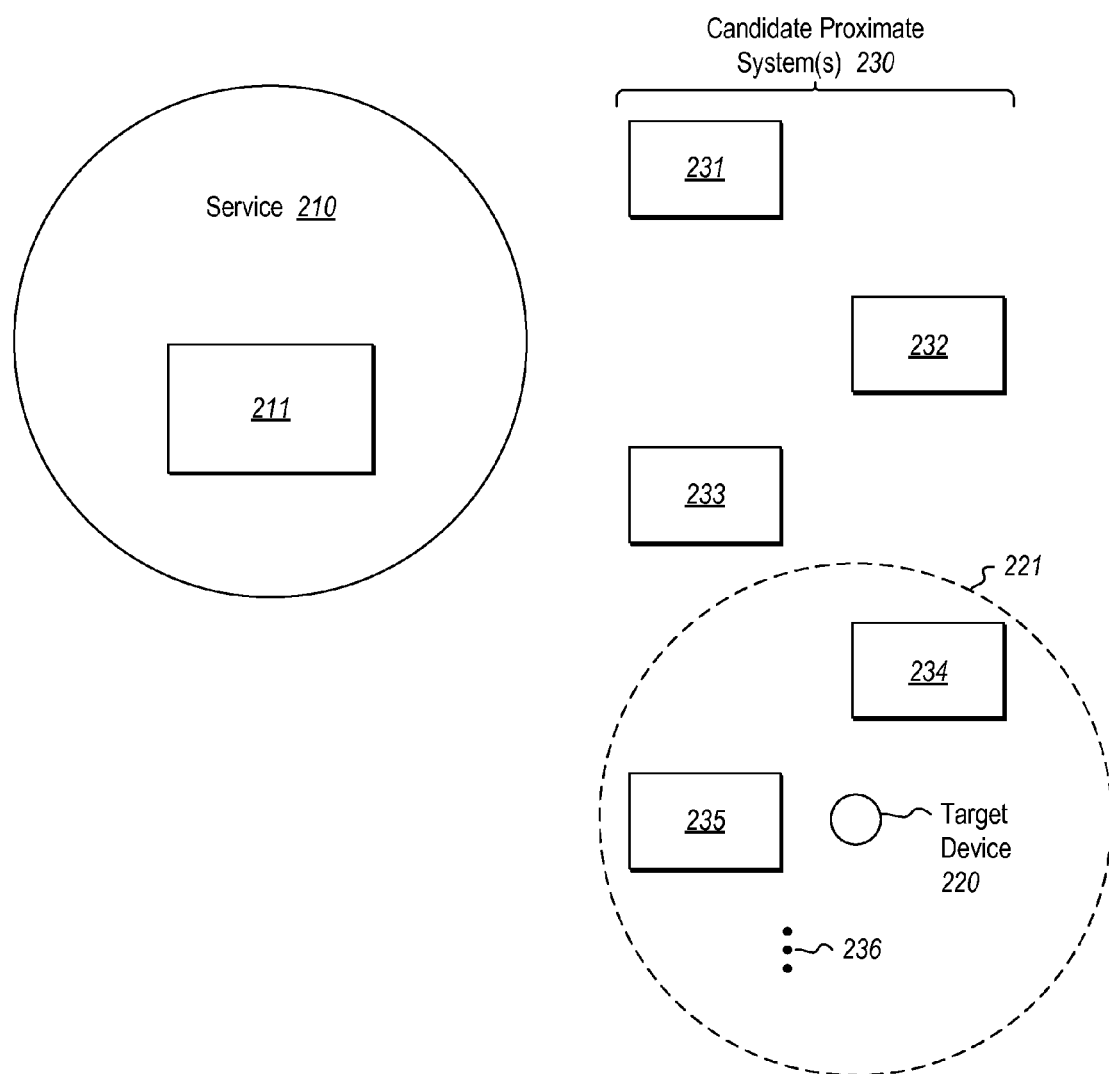
FIG. 2 illustrates a network environment in which the principles described herein may operate, and which includes a service, a target device, and a set of candidate proximate systems.

FIG. 2 illustrates a network environment 200 in which the principles described herein may operate. The network environment 200 includes a service 210, a target device 220, and a set 230 of candidate proximate systems 230 (which does not include the target device 220). The service 210 may be a cloud computing environment, a cluster of servers, or even a single server. The service 210 operates to assist in the partial or full disabling of the target device 220 once the target device 220 is suspected as being lost or stolen, despite there being no direct connection between the service 210 and the target device 220. For instance, perhaps the cellular service of the target device 220 has been turned off by a thief in an effort to keep the target device 220 from being disabled. Each of the service 210 and the target device 220 may be structured and operate as described above for the computing system 100 of FIG. 1.

The target device 220 may be a mobile device, such as a laptop, smartphone, smartwatch, wearable, or the like. In this example, assume that the service 210 suspects the target device 220 as being lost or stolen. As an example, perhaps the user of the target device, or an agent of that user, has reported the target device 220 as being lost or stolen. In another example, the service 210 might infer that the target device 220 has been lost or stolen based on one or more circumstances (e.g., such as there being a certain number of consecutive failed login attempts, and/or the target device 220 has failed to check in to the service 210). In a common scenario for stolen devices, the cellular connection of the target device 220 may be turned off so as not to be directly in communication with the service 210.

Rather, in accordance with the principles described herein, the target device 220 is capable of some level of communication using non-cellular means. For instance, suppose there are n possible non-cellular links on the target device (where n is a whole number). The target device may restrict how many or which non-cellular links may be disabled. For instance, to ensure that at least one non-cellular link remains active, the target device may allow a user to disable only (n−1) of the non-cellular links (meaning all but one). In order to disable that last non-cellular link, the user might have to turn on one other non-cellular link. Accordingly, the target device might impose the restriction that at least one non-cellular link that is to remain active in order to increase likelihood of making contact with the target device. For instance, all non-cellular link options can still be managed by the user via settings, but even when turned off, that one non-cellular link might remain on for just the purpose of receiving and transmitting disablement communications. Alternatively, the target device may not expose user-accessible settings for an embedded non-cellular link so that it is always enabled and not visible to the user.

The target device might also impose minimum restrictions on what qualifies as a suitable non-cellular link for use with this invention. For instance, Near Field Communication (NFC) channels have a very small field of communication. Such a small field of communication might make it unlikely that there would be a candidate proximate system brought within range of the target device. Bluetooth has a larger range of communication, and WiFi has yet a larger field of communication. Thus, there may be restrictions on what would be required of the one non-cellular link that is to remain active.

As an example, in FIG. 2, the target device 220 is illustrated as having a certain range 221. Note that two of the candidate proximate systems (i.e., candidate proximate system 234 and 235) are within range 221 of the target device 220. As an example, such non-cellular communication might include Bluetooth communication, near field communication, WiFi communication (e.g., an 802.11 connection), a peer-to-peer connection, or the like. Of course, the range 221 may vary by link type. For instance, Bluetooth tends to have a larger range than Near Field Communication (NFC), and WiFi communication has an even larger range than Bluetooth.

The candidate proximate systems 230 are computing systems that are potentially in range of the target device 220 from the perspective of the service 210. If, for example, the location of the target device 220 is completely unknown to the service 210, then a "candidate proximate system" might be any computing system in the world. On the other hand, the service 210 might have at least some information regarding potential locations of the target device 220, or which systems might be proximate the target device. In that case, the set of candidate proximate system might be narrowed down significantly to those known systems that are more likely to be closer to the target device. Examples of how this might be accomplished will be described further below.

The set 230 of candidate proximate systems 230 is illustrated as including five systems 231 through 235. However, this is for purposes of example only. As represented by ellipses 236, as time passes, the set of candidate proximate systems may change. The candidate proximate systems 230 may be fixed computing systems (such as a desktop or a server), or may be mobile systems (such as a laptop, smartphone, smartwatch, wearable, automobile-based computing system or the like). Accordingly, the relative position between the target device 220 and the candidate proximate systems 230 may change as one or both of the target device 220 and the respective candidate proximate system moves. Each of the set 230 of candidate proximate systems may likewise be structured and operate as described above for the computing system 100 of FIG. 1. Of course, each of the set 230 of candidate proximate systems need not be of the same type as each other or as the target device 220.

Note that FIG. 2 is kept quite simple in terms of the number of candidate proximate systems and the number of target devices illustrated. This is simply for purposes of describing the principles using a straightforward example. However, if the service 210 is widespread, and perhaps even global, the service 210 may be able to communicate with millions or perhaps even billions of computing systems. Accordingly, the number of candidate proximate systems 230 may be literally millions, or even billions in the future. Furthermore, the number of target devices that are suspected lost or stolen may be literally many thousands, if not millions. For such larger services, scalability is important. For instance, rather than send the list of thousands of lost target devices to each possible computing system in the world, some level of targeting of the list of target devices may be performed by culling the list of target devices for some candidate proximate systems, and/or by being selective about which proximate system is notified of which suspected lost target device.

Figure 3:
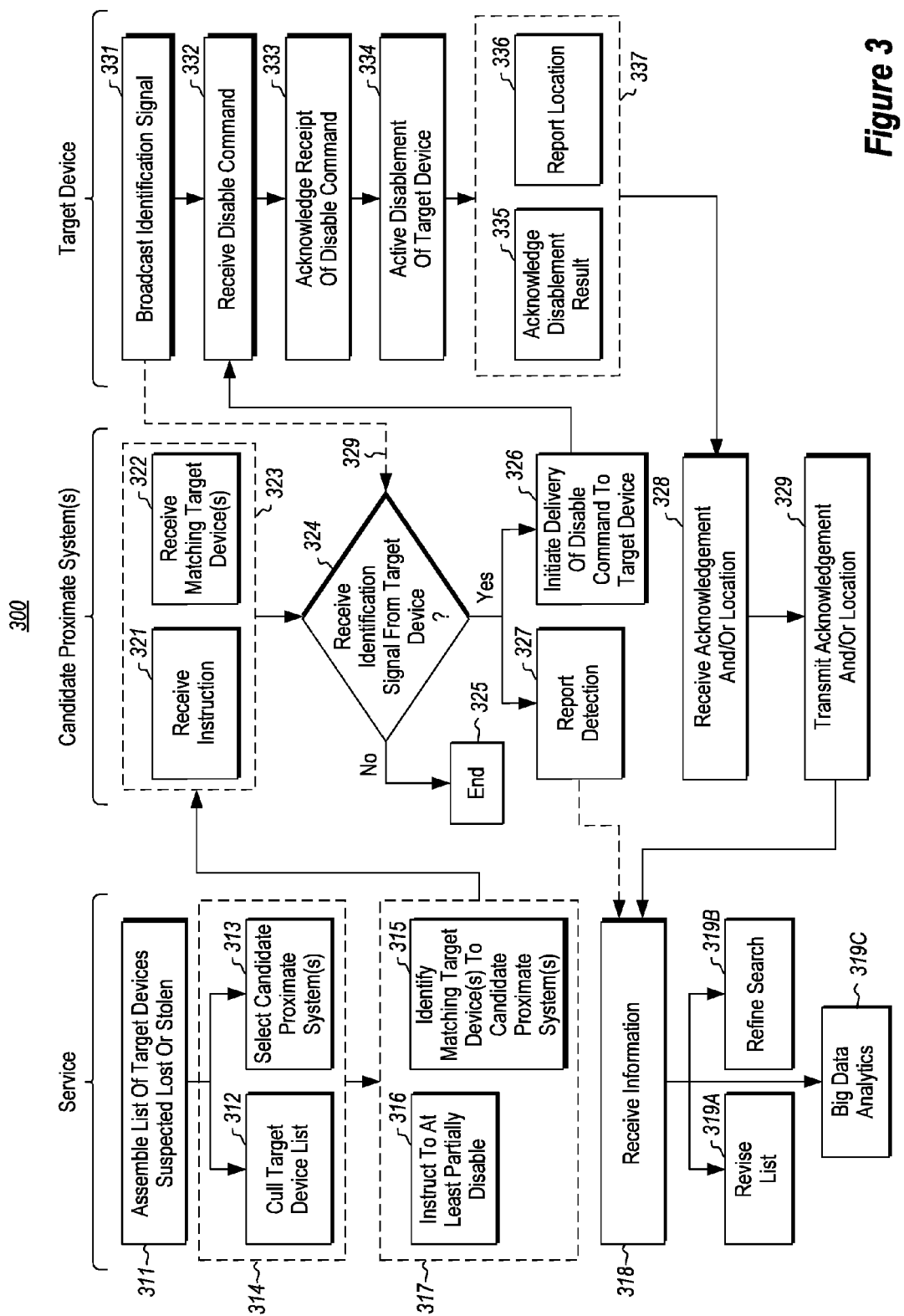
FIG. 3 illustrates a flowchart of a method for at least partially disabling a target device that is reported lost or stolen, and which no longer has a viable direct connection with a service.

FIG. 3 illustrates a flowchart of a method 300 for at least partially disabling a target device that is suspected lost or stolen, and which no longer has a viable direct connection with a service. For instance, the method 300 may be performed in the network environment 200 of FIG. 2 in the context in which the target device 220 no longer has a viable direct connection with the service 210 (such as when the target device 220 has its cellular service disabled, if network credentials (e.g. SIM) are removed, and/or if the signal is blocked). Accordingly, the method 300 of FIG. 3 will now be described with frequent reference to the network environment 200 of FIG. 2.

Some acts of the method 300 may be performed by the service 210 as represented in the left column of FIG. 3 under the header "Service" and are labelled in the 310s. Other acts of the method 300 may be performed by one of the candidate proximate systems 230 as represented in the middle column of FIG. 3 under the header "Candidate Proximate System" and are labelled in the 320s. Yet other acts of the method 300 may be performed by the target device 220 as represented in the right column of FIG. 3 under the header "Target Device" and are labelled in the 330s.

The service assembles a list of target devices that are suspected as lost or stolen (act 311). For instance, in FIG. 2, the service 210 may assemble a list 211 of lost devices. In some embodiments, the list of target devices may be regularly updated as new devices are reported lost or stolen, or are suspected of being lost or stolen. Furthermore, the list of target devices may be revised when a target device is found or confirmed disabled (e.g., at the conclusion of method 300) so as to be rendered of lesser value to a non-owner possessor of the target device. Alternatively or in addition, the target device may be removed from the list (or otherwise the list might be modified to reflect that the target device is found) if the user or the user's authorized agent indicates to the service 210 that the device has been found.

For a given candidate proximate system, the service also identifies which of the target devices the candidate proximate system is to be notified of (act 312). This might be accomplished using either a push method or a pull method. For instance, in an example push method, the candidates might be notified on a periodic basis. For instance, all candidate proximate systems 230 might be notified of all target devices on the assembled list. Alternatively, one, some or all of the candidate proximate systems 230 might be notified of only a portion of the target devices on the list. Thus, for one or more of the candidate proximate systems, the service 210 might perform some culling of the list. This allows the service to scale more globally. For instance, if the target device's last known location was in Las Vegas, there may not be a need to include the target device in a list provided to a candidate proximate system in Australia. Thus, a given candidate proximate system need not have the same list as another candidate proximate system. Alternatively, in a pull method, the candidate proximate systems might still be identified, but the notification would await that candidate proximate system calling into the service 210.

For some target devices, the service might have next to no information regarding where the target device might be, thereby potentially warranting a more expanded search. In this case, the target device will be found on relatively more lists that are provided to a relatively large number of candidate proximate systems. At one extreme, the target device is included on all lists that are provided by the service 210 to any of the candidate proximate systems.

For some target devices, the service might have more detailed information regarding possible locations for the target devices, thereby potentially warranting a more focused search (with a smaller number of candidate proximate systems). In this case, the target device will be found on relatively few lists that are provided to relatively few candidate proximate systems.

As an example, perhaps the target device might be included when provided to candidate proximate systems that are within a certain distance of the last known location of the target device, and/or that are within known areas for distribution of stolen devices. The search area may expand dynamically. For instance, as time passes since the target device was last seen by its owner, the search area may widen, and thus the target device might be included in more lists for an ever expanding range around the area of last known position of the target device.

Alternatively or in addition, the target device might be included in lists that are provided to candidate proximate systems that are owned by acquaintances or family members of the owner of the lost device. For instance, perhaps the device was simply left in a sisters' car. Placing the target device on the list provided to the sister's device may result in the target device being found the next time the sister approaches her own car.

As another example, a candidate proximate system may have previously received an identification signal from a target device, but confirmation that the target device performed disablement was never received. Nonetheless, this potential failure can be useful information as it provides an important clue as to the proximity of the target device at a particular point in time. That information can be used in subsequent performances of the method 300 in order to narrow down the set of candidate proximate systems to those around that particular area.

The method 300 also includes selecting the candidate proximate systems that are to be provided to at least some of the list of target devices (act 313). In fact, the act of culling the list of assembled target devices (act 312) and the act of selecting the candidate proximate systems (act 313) that are to receive that list may be considered as an integrated step of matching target devices to candidate proximate systems (act 314).

Referring to FIG. 2, note that the matching operation may not be perfect, because the information held by the service 210 to perform the matching may be imperfect, stale, or even non-existent. Accordingly, the service 210 might match the target device 220 to the candidate proximate systems 231 through 236, even though in fact candidate proximate systems 231 through 233 are not within range 221 of the target device 220. Thus, there is no claim herein that the service 210 will ideally match target devices to candidate proximate systems 230, and such ideal matching will in almost all cases not be possible.

The service then transmits the list of matching target devices to the corresponding candidate proximate system (act 315). Thus, for instance, in addition to potentially notifying the candidate proximate system(s) of other potential target devices, the service 210 notifies the candidate proximate systems 230 of the target device 220. The service further transmits an instruction for any of the candidate proximate systems to transmit an active disable command to any of the target devices on the list of target devices if the corresponding candidate proximate system receives an identification signal from the target device (act 316). Since these two transmissions (act 315 and 316) may be in a single transmission, or since the instruction of act 316 may be implicit, the acts 315 and 316 are shown within a larger transmission act 317.

The types of disable commands may be wide ranging, but may all share the characteristic that the value of the target device is reduced as a result of the disablement. For instance, the disablement may inhibit the use of the target device to the non-owner in possession. As examples, the active disable command may be a software reinstall command that is structured to be interpretable by the target device as instructing a software reinstall on the target device. Alternatively or in addition, the active disable command might be a software downgrade command that is structured to be interpretable by the target device as instructing a software downgrade on the target device. Alternatively or in addition, the active disable command might be a software removal command that is structured to be interpretable by the target device as instructing a software removal on the target device.

Operation of the method 300 then passes to the candidate proximate systems (e.g., any one of the candidate proximate systems 230), which may each process in accordance with the logic under the header "Candidate Proximate System" in FIG. 3. For instance, the candidate proximate system receives the identification of the target device (act 322), which may be in the form of a list of target devices on which the target device is identified. The candidate proximate system may also receive the instruction (act 321) to provide a disablement instruction to the target device if found. Since these receipts of act 321 and 322 may occur in a single transmission and/or since the instruction may be implicit, the acts 321 and 322 are shown as part of a larger single receiving act 323. In some embodiments, the candidate proximate system might itself further cull the assembled list of target device based on further information known to the candidate proximate system that might affect the probability of being able to reach given target devices.

If the candidate proximate system never receives an identification signal from the target device ("No" in decision block 324), then the method may simply end (act 325) with respect to that specific candidate proximate system and this iteration of the method 300. For instance, in FIG. 2, the candidate proximate system 231 may never receive an identification signal from the target device 220 since the candidate proximate system 231 is presently outside of the range 221. Accordingly, the candidate proximate system 231 might end the method 300 at act 325. This receipt of acknowledgment could also be a pull or push method. For instance, perhaps target devices broadcast on the non-cellular link that the target device is there (and perhaps also indicates its location). Alternatively, or in addition, the candidate proximate computing systems might broadcasts requests for the target devices to acknowledge their presence, and the target device responds to that request with an acknowledgement.

On the other hand, if the candidate proximate system does receive an identification signal from the target device ("Yes" in decision block 324), the candidate proximate system initiates delivery of the appropriate active disable command (act 326) to the target device. Also, the candidate proximate system reports the detection (and possible estimated location) of the target device to the service (act 327. This information may be helpful in future matching operations (act 214). For instance, the service 210 may soon repeat the method 300 using proximate candidate systems selected so as to be surrounding the last detected or estimated position of the target device. The candidate proximate system will then await confirmation that the target device performed the active disable command, or at least confirmation that the target device has processed the active disable command.

This active disable command is structured to be interpretable by the target device as an instruction to actively disable the at least some functionality in a manner that persists across target device resets. For instance, the instruction may be persisted in persistent memory or storage of the target device such that upon a reset of the target device, the target device checks that persistent memory or storage for the presence of a persisted instruction, and performs the instruction. This prevents a thief from resetting the target device to prevent disablement if they suspect a disable command has been received and/or initiated on the target device. Furthermore, when software changes occur, those changes are persisted in persistent memory or storage, as opposed to volatile memory.

The target device performs its part by broadcasting an identification signal (act 331), which may also include location information of the target device. While the direct connection between the service 210 and the target device 220 may be disabled, the target device 220 is still capable of broadcasting an identification signal across a certain range 221, depending on the range capability of the non-cellular link. Those candidate proximate systems that are within the range 221 may thus receive the identification signal, causing that candidate proximate system to branch at "Yes" in decision block 324, and thus cause the target candidate proximate system to report the detection (act 327) (and potentially the reported location of the target device, and initiate delivery of the active disable command to the target device (act 326). The target device may be configured to regularly broadcast this identification signal (act 331), even well before the method 300 is initiated, and even perhaps before the target device is reported lost or stolen. The dashed arrow 329 represents the possibility that the broadcast identification signal 331 will be received by the candidate proximate system, thereby impacting decision block 324.

If a candidate proximate system initiates delivery of the disable command to the target device (act 326), the method 300 proceeds at the target device if the target device receives that disable command (act 332). In response, the target device acknowledges receipt of the active disable command (act 333). Furthermore, the target device, (much to the chagrin of a maleficent non-owner possessor of the target device) then actively disables (act 334) at least one function of the target device in a manner that survives device resets. This is despite the non-owner possessors turning off the direct connection (e.g., the cellular network) between the service 210 and the target device 220, turning off other communication link types (e.g., Bluetooth, WiFi), and/or resetting the target device 220.

Once processing active disablement command (act 334) is completed, the target device transmits an acknowledgement of completion of processing of the active disablement command (act 335). For instance, the target device may report success or failure of the active disablement operation. Furthermore, optionally, the target device may report an estimated location of the target device to the communicative system in response to receiving the active disable command (act 336). As this acknowledgment and reporting of location may occur in a single transmission, the acts 335 and 336 are illustrated as part of a larger transmission act 337. However, the reporting of location (act 336) is still helpful regardless of whether the disablement was successful. Accordingly, the reporting of the location (act 337) may be performed in response to the receiving the disable command (act 332) and/or perhaps as part of the broadcast of the identification signal (act 331).

The candidate proximate system then receives the information transmitted by the target device (act 328). For instance, this information could include the acknowledgement that the active disablement has been performed and/or the reported location of the target device. The candidate proximate system then provides (act 329) the acknowledgement and/or location information to a predetermined location (such as the service 210). Even if the candidate proximate system did not receive location information from the target device, the candidate proximate system may still report its own location and/or an estimate of the location of the target device. For instance, the candidate proximate system may extrapolate an estimated location of the target device based on signal strength of the identification signal received in act 332, or of the communication received in act 328.

The service 210 then receives the information (act 318) transmitted by the candidate proximate computing system in act 328. This might include the acknowledgement that the active disable command has been performed on the target device, in which case the list of target device is updated (act 319A). For instance, the target device might be removed from the list of target devices (resulting in continuous performance of the act 311 of assembling the list of target devices). Alternatively, the entry for the target device in the list may have its state changed so that the target device is no longer included in active searches.

This received information might also include information regarding the location of the target device. If this is coupled with an acknowledgment that the active disable command has been performed on the target device, then this information may be used (although with location information from other target devices) to perform big data analysis (act 319C). For instance, the flow of stolen devices may be tracked, perhaps assisting law enforcement. Even if this location information is not coupled with acknowledgement of the active disablement, the location information may be used to perform more fine-grained matching (act 319B) of the target device to candidate proximate systems in act 314 for subsequent iterations of the method 300.

Accordingly, a mechanism has been described in which intelligent searching for target devices may be performed when such target devices have been reported as lost or stolen, even if that target device no longer has direct communication with the service that performs the search. Furthermore, the target device may be at least partially disabled (thereby reducing value to a non-owner possessor) even if that target device no longer has direct communication with the service that initiates the disable command. Finally, location data from the search may be used to perform big data analytics useful in evaluating the flow of stolen or lost target devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for issuing a command to disable functionality of a target device that is suspected of being lost or stolen, the method being implemented at a computer system that includes one or more processors, the method comprising:
   receiving information corresponding to a target device that has been reported as being lost or stolen, wherein the received information at least includes a last known location of the target device;
   based on the received information, selecting one or more candidate systems that are identified as having previously shared a relationship with the target device, wherein which candidate systems are included within the selected one or more candidate systems is determined by:
      identifying a search area that includes a first subset of candidate systems and that corresponds to the last known location of the target device;
      determining an approximate amount of time that has passed since the target device was lost or stolen; and
      based at least partially on the approximate amount of time that has passed, increasing a size of the search area such that the search area includes a second subset of candidate systems, the second subset at least including the first subset;
   receiving, from at least one of the one or more candidate systems, an identification signal that was sent from the target device to the at least one candidate system; and
   in response to receiving the identification signal from the at least one candidate system, initiating delivery of an active disable command to the target device, the active disable command being structured to be interpretable by the target device as a mandatory instruction to actively disable at least some functionality of the target device in a manner that persists across subsequent resets of the target device.

2. The method of claim 1, further comprising:
   receiving confirmation that the active disable command has been performed on the target device.

3. The method of claim 1, further comprising:
   reporting, to a predetermined system, a performance of the active disable command on the target device.

4. The method of claim 1, further comprising:
   reporting to a predetermined system regarding an estimated location of the target device.

5. The method of claim 1, wherein the active disable command is a software reinstall command that is structured to be interpretable by the target device as instructing a software reinstall on the target device.

6. The method of claim 1, wherein the active disable command is a software downgrade command that is structured to be interpretable by the target device as instructing a software downgrade on the target device.

7. The method of claim 1, wherein the active disable command is a software removal command that is structured to be interpretable by the target device as instructing a software removal on the target device.

8. A computer system, comprising:
   one or more processors; and
   one or more computer-readable hardware storage devices having stored thereon computer-executable instructions that are executable by the one or more processors and that cause the computer system to issue a command to disable functionality of a target device that is suspected of being lost or stolen by causing the computer system to:
      receive information corresponding to the target device, wherein the received information at least includes a last known location of the target device;
      based on the received information, select one or more candidate systems that are identified as having previously shared a relationship with the target device, wherein which candidate systems are included within the selected one or more candidate systems is at least partially determined by:
         identifying a search area that includes a first subset of candidate systems and that corresponds to the last known location of the target device;
         determining an approximate amount of time that has passed since the target device was lost or stolen; and
         based at least partially on the approximate amount of time that has passed, increasing a size of the search area such that the search area includes a second subset of candidate systems, the second subset at least including the first subset;
      receive, from at least one of the one or more candidate systems, an identification signal that was sent from the target device to the at least one candidate system; and
      in response to receiving the identification signal from the at least one candidate system, deliver an active disable command to the target device, the active disable command being persistable across a subsequent reset of the target device.

9. The computer system of claim 8, wherein the target device is identified as possibly being lost or stolen based on one or more factors.

10. The computer system of claim 9, wherein the one or more factors are selected from a group comprising:
   a number of failed login attempts of the target device; and
   whether the target device has checked in with a particular service.

11. The computer system of claim 8, wherein subsequent resets of the target device include:
   turning the target device off and on;
   restoring the target device to factory settings; and
   reformatting the target device with a different version or different type of operating system.

12. The computer system of claim 8, wherein which candidate systems are included within the selected one or more candidate systems is also at least partially determined by:
   identifying a second subset of candidate devices, wherein each candidate device in the second subset is owned by an acquaintance of an owner of the target device.

13. The computer system of claim 8, wherein the computer executable instructions further cause the computer system to:
   after delivering the active disable command to the target device, receive an updated estimated location of the target device.

14. The computer system of claim 13, wherein the updated estimated location of the target device is received from the target device.

15. The computer system of claim 8, wherein the shared relationship between the selected one or more candidate systems and the target device is based on a common geographic region.

16. The computer system of claim 8, wherein the active disable command is configured such that the active disable command is persistable to a storage of the target device.

17. The computer system of claim 8, wherein the received information corresponding to the target device includes a list that details a plurality of devices which have been identified as possibly being lost or stolen, and wherein, after the active disable command is delivered to the target device, the list is updated.

18. The computer system of claim 17, wherein updating the list includes updating a state of the target device that is included within the list such that the target device is no longer searched for when the list is propagated to other computer systems.

19. One or more hardware storage devices having stored thereon computer-executable instructions that are executable by one or more processors of a computer system and that cause the computer system to issue a command to disable functionality of a target device that is suspected of being lost or stolen by causing the computer system to:
   receive information corresponding to the target device, wherein the received information at least includes a last known location of the target device;
   based on the received information, select one or more candidate systems that are identified as having previously shared a relationship with the target device, wherein which candidate systems are included within the selected one or more candidate systems is determined by:
      identifying a search area that includes a first subset of candidate systems and that corresponds to the last known location of the target device;
      determining an approximate amount of time that has passed since the target device was lost or stolen; and
      based at least partially on the approximate amount of time that has passed, increasing a size of the search area such that the search area includes a second subset of candidate systems, the second subset at least including the first subset;
   receive, from at least one of the one or more candidate systems, an identification signal that was sent from the target device to the at least one candidate system; and
   in response to receiving the identification signal from the at least one candidate system, deliver an active disable command to the target device, the active disable command being persistable across a subsequent reset of the target device.

20. The one or more hardware storage devices of claim 19, wherein the computer executable instructions further cause the computer system to:
   after delivering the active disable command to the target device, receive, from the target device, an updated estimated location of the target device.

* * * * *